United States Patent [19]
Cors et al.

[11] 3,897,030
[45] July 29, 1975

[54] SYSTEM FOR CONTROLLING THE PITCH ATTITUDE OF A ROCKET MOTOR BOOSTED AIRCRAFT

[76] Inventors: John T. Cors, 1008 Beatrice Dr., Dayton, Ohio 45404; Virgil B. Battenberg, 600 Grants Trl., Dayton, Ohio 45459

[22] Filed: Mar. 28, 1974

[21] Appl. No.: 455,816

[52] U.S. Cl. ................ 244/63; 244/54; 244/77 R
[51] Int. Cl. ................... B64c 15/14; B64d 41/00
[58] Field of Search ......... 244/77 R, 58, 63, 52, 54, 244/322, 76 J

[56] References Cited
UNITED STATES PATENTS

| | | | |
|---|---|---|---|
| 2,544,830 | 3/1951 | Grill et al. | 244/63 X |
| 2,745,347 | 5/1956 | Lightbody et al. | 244/63 X |
| 2,776,622 | 1/1957 | Robert | 244/63 X |
| 2,814,453 | 11/1957 | Trimble et al. | 244/63 |
| 3,070,329 | 12/1962 | Hasbrouck | 244/52 |
| 3,114,520 | 12/1963 | Finvold | 244/52 X |

*Primary Examiner*—Duane A. Reger
*Assistant Examiner*—Barry L. Kelmachter
*Attorney, Agent, or Firm*—Richard J. Killoren

[57] ABSTRACT

A rocket motor thrust vector control system having a linear actuator, responsive to the pitch attitude control system of the aircraft, which operates a pivotable member to rotate the rocket motor in pitch with respect to the aircraft longitudinal axis. In one embodiment, the pivotable member transmits the rocket motor thrust to a thrust frame attached to the aircraft. In a second embodiment, the rocket motor thrust is applied to a thrust frame by means of a linkage assembly pivotably secured to the rocket motor on a line through the rocket motor center of gravity. A linear actuator rotates a bell crank coupled to the rocket motor to vary the thrust vector in response to an aircraft pitch attitude control system signal.

4 Claims, 10 Drawing Figures

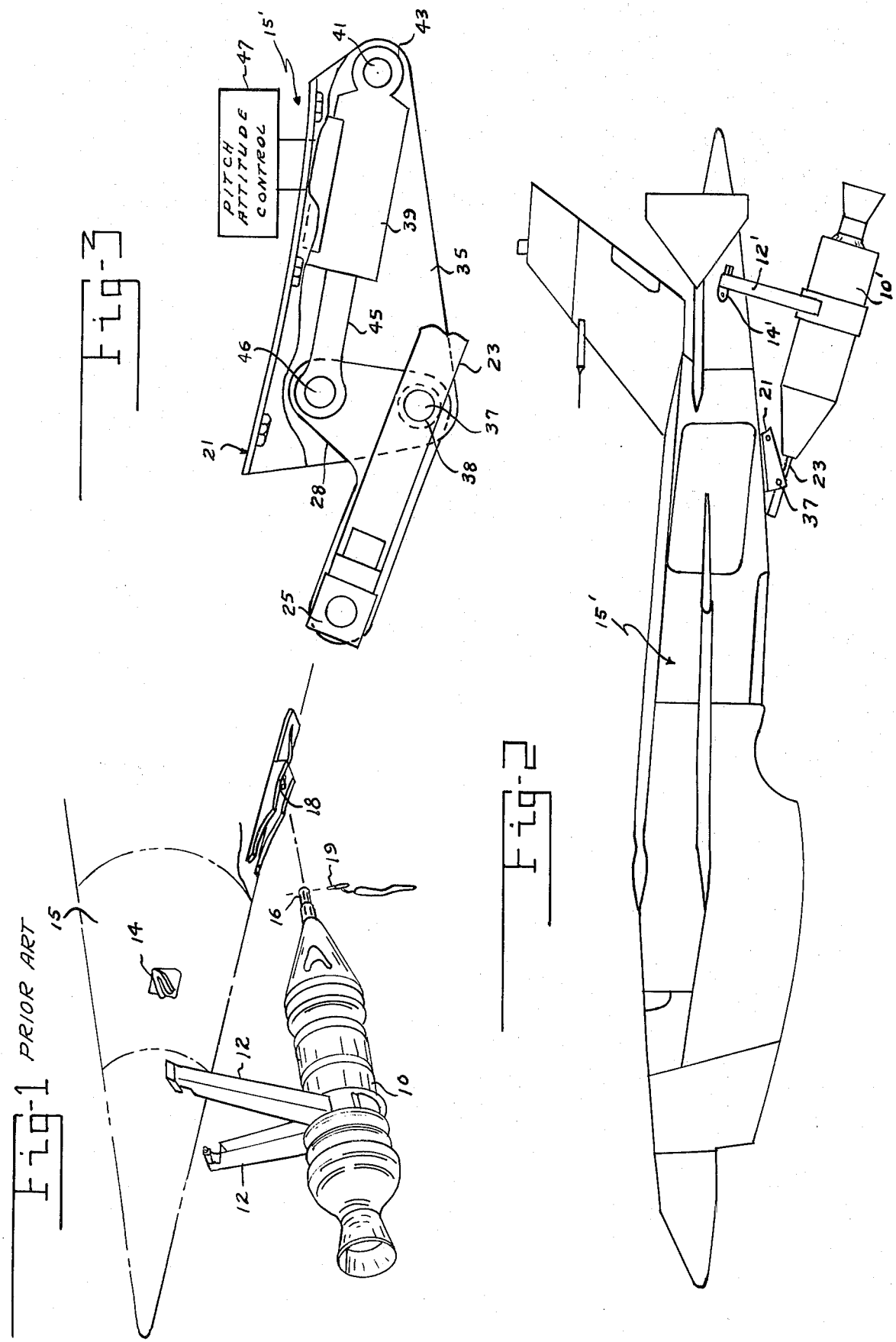

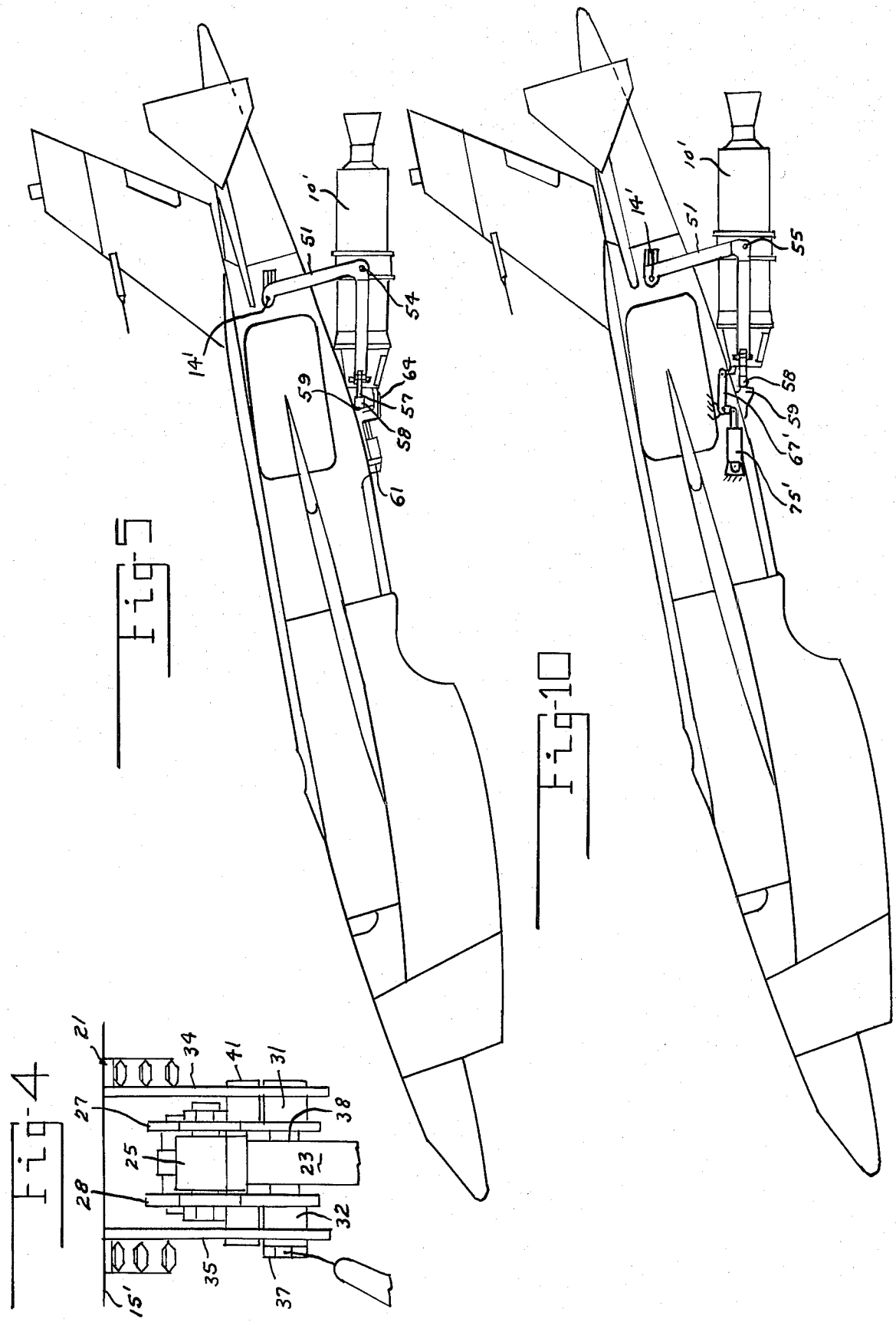

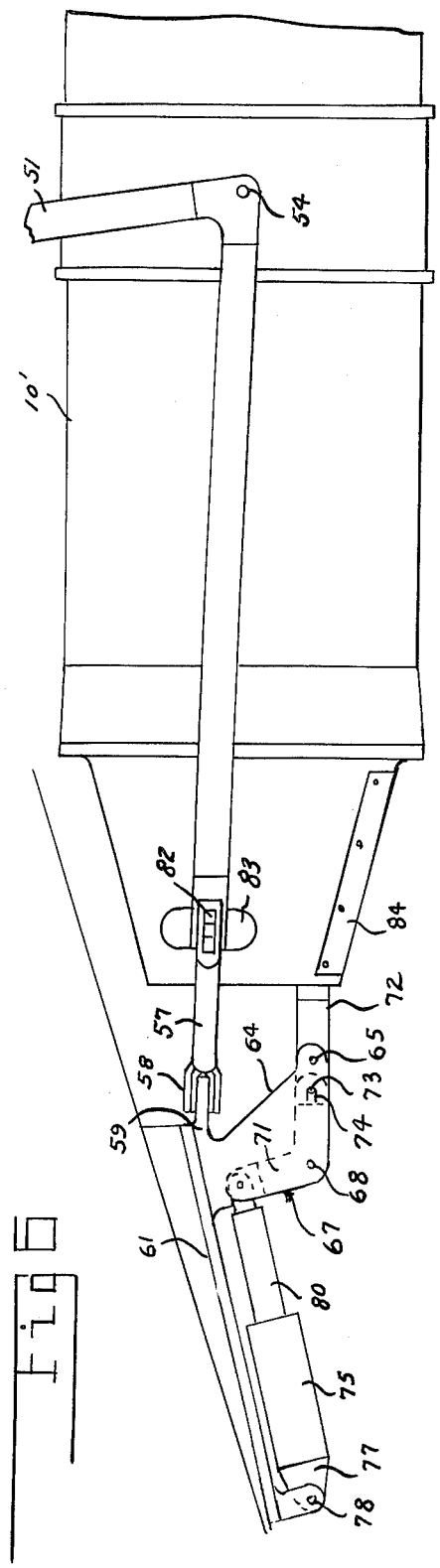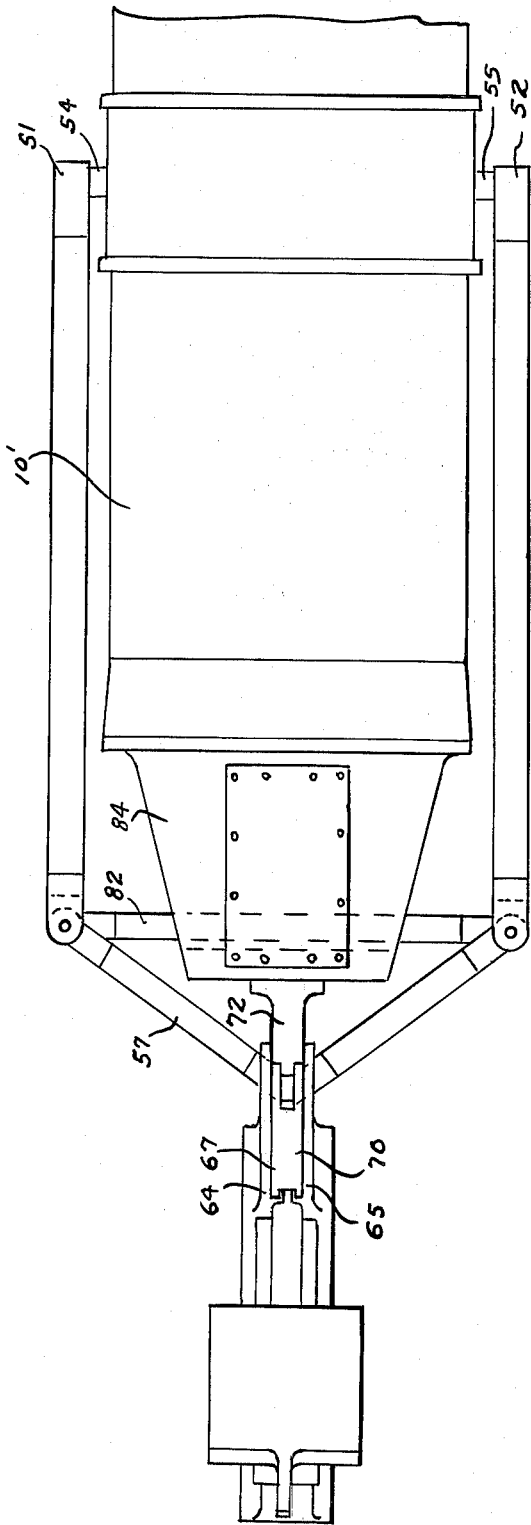

SYSTEM FOR CONTROLLING THE PITCH ATTITUDE OF A ROCKET MOTOR BOOSTED AIRCRAFT

RIGHTS OF THE GOVERNMENT

There is reserved to the Government of the United States a nonexclusive, irrevocable, royalty-free license in the invention described herein with power to grant licenses for all governmental purposes.

BACKGROUND OF THE INVENTION

In zero-length launch of aircraft, the jet engine is used with a rocket motor to accelerate the aircraft to flying speed in a brief interval of time. In early designs of such aircraft, such as described in the patent to Mathiesel et al, U.S. Pat. No. 2,922,602, the rocket motor was positioned to direct its thrust through the center of gravity of the aircraft.

In later designs, wherein the jet engine is displaced from the longitudinal axis of the aircraft, the rocket motor is positioned to balance the respective aerodynamic, engine thrust and motor thrust moments around the aircraft center of gravity.

A major problem of this later design encountered during zero launch is the control of the aircraft pitching moments which are dependent upon: the magnitudes and variations of engine and rocket motor thrust; the variations in the center of gravity during the boost phase; the variations in the aircraft aerodynamics; and the engine exhaust impingement on the rocket motor assembly.

It has been suggested in the prior art that a thrust vector control system be used with a control device in the rocket exhaust nozzle or aft of the rocket exhaust nozzle. Since the rocket motor is normally jettisoned after launch, such a control system would be jettisoned with the boost motor, thus increasing launch costs.

BRIEF SUMMARY OF THE INVENTION

According to this invention, apparatus is provided for varying the rocket motor thrust vector direction relative to the center of gravity of the aircraft in response to the pitch attitude control system of the aircraft. The rocket motor is supported on the aircraft so as to be pivotable in the pitch plane with respect to the aircraft longitudinal axis. An actuator, responsive to the aircraft pitch control system, is made to exert a force on the rocket motor so as to adjust the direction of the rocket motor thrust vector, thus maintaining the desired balance of moments about the aircraft center of gravity.

IN THE DRAWINGS

FIG. 1 is a partially schematic illustration showing a prior art aft rocket motor support system.

FIG. 2 is a side view of an aircraft and rocket motor assembly including the rocket thrust vector control system of the invention.

FIG. 3 is an enlarged partially cut away side view of the rocket motor thrust vector control system of the device of FIG. 2.

FIG. 4 is a left end view of FIG. 3.

FIG. 5 is a side view of an aircraft and rocket motor assembly including a modified rocket motor thrust vector control system according to another embodiment of the invention.

FIG. 6 is an enlarged side view of the apparatus of FIG. 5.

FIG. 7 is a bottom view of the apparatus of FIG. 6.

FIG. 10 shows a further modification of a rocket motor thrust vector control system according to further embodiment of the invention.

DETAILED DESCRIPTION OF THE INVENTION

Figure 8:
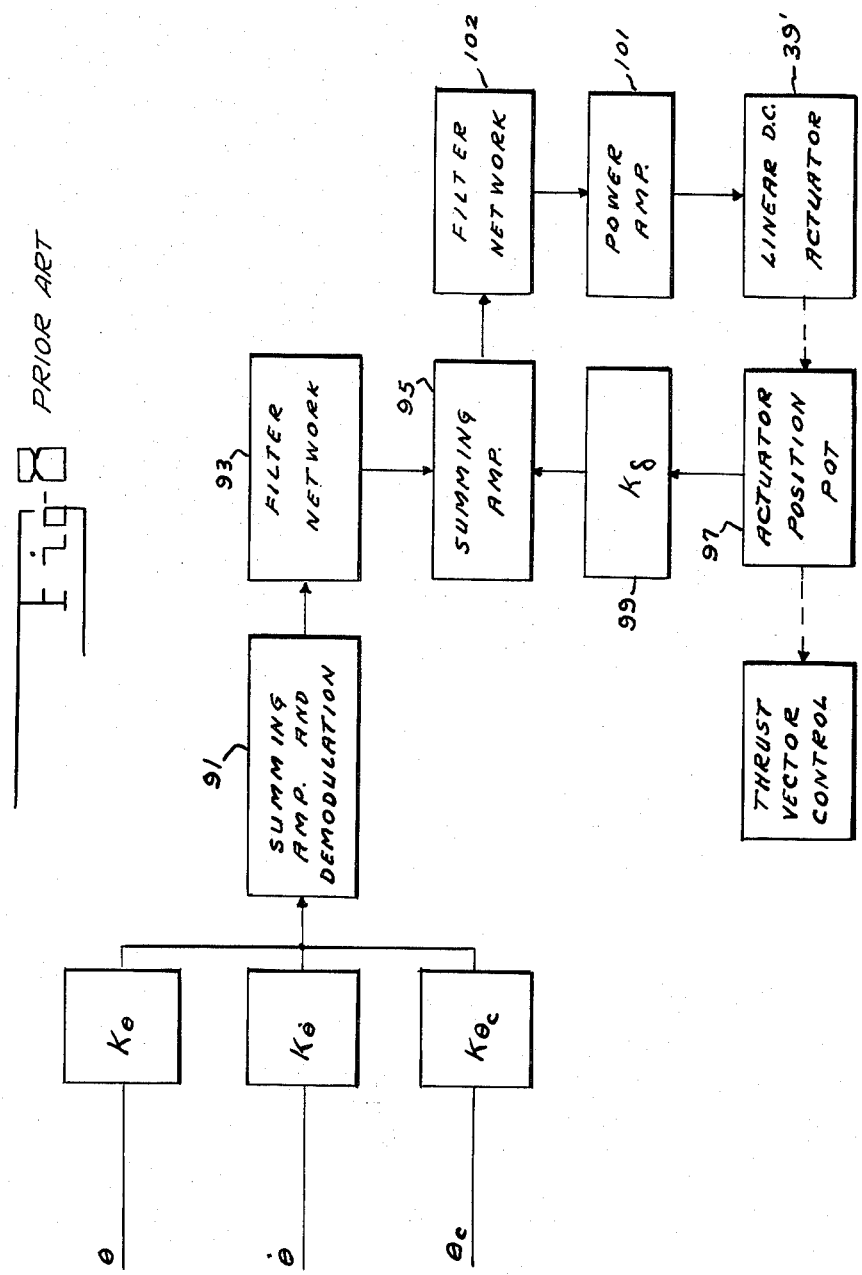
FIG. 8 is a circuit schematic in block form of a conventional aircraft pitch attitude control system which may be used with the devices of FIG. 2 and FIG. 5.

Reference is now made to FIG. 1 of the drawing, which shows a prior art rocket motor attachment system having a rocket motor 10 secured to aft rocket motor supports 12 which engage retainers 14 on the aircraft 15. An adaptor 16 engages the support member 18 and is retained thereon by a pin 19. In normal operation, the pin 19 holds the rocket motor in position until the aircraft and rocket motor are mounted on the launch rack. The pin 19 is removed before launch. During rocket motor burn, the supports 12 are held in engagement with retainers 14 and the adaptor 16 is held in engagement with the support member 18 by rocket motor thrust.

After rocket motor burnout, the supports 12 and the adaptor 16 drop free of the retainers 14 and support member 18, respectively.

According to one embodiment of the invention, as shown in FIGS. 2, 3 and 4, the supports 12' and 14' are substantially as described above with respect to FIG. 1. A rocket motor thrust vector control assembly 21 is substituted for the adaptor 16 and support member 18. The thrust vector control assembly is responsive to the aircraft pitch attitude control system 47 and adjusts the direction of the thrust vector of the rocket motor 10'.

As shown in greater detail in FIGS. 3 and 4, the rocket motor thrust shaft 23 engages a thrust block 25 pivotably secured to a pair of thrust arms 27 and 28. The thrust arms 27 and 28 have hollow journal members 31 and 32 which engage support brackets 34 and 35, which are secured to the aircraft 15' to thereby form a thrust frame.

A pull pin 37 passes through the journal member 32, through a hole 38 in the thrust shaft 23 and then through journal member 31 to retain the rocket motor 10' prior to mounting on the launch rack in the same manner as described with respect to the device of FIG. 1.

A linear actuator 39 has a pin 41 passing through a ring member 43 and engaging the support brackets 34 and 35. The movable shaft 45 of actuator 39 is pivotably secured to the thrust arms 27 and 28 by means of a pin 46. The actuator 39 is controlled by the aircraft pitch attitude control system, shown schematically at 47, which will be described in greater detail below.

In the operation of the apparatus, the aircraft is positioned on a launch rack, not shown, with the pull pin 37 in place. After the aircraft is positioned on the launch rack, the pin 37 is removed. After launch, the aircraft pitch attitude control system operates the actuator 39 to control the position of thrust arms 27 and 28 and the position of thrust shaft 23 to control the direction of the thrust vector of the rocket motor 10'. After rocket motor burnout, the supports 12' and thrust shaft 23 fall free of retainers 14' and the thrust block 25.

In the apparatus thus far described, the linear actuator 39 must operate against a component of the rocket motor thrust.

In the apparatus shown in FIGS. 5–7, a pair of thrust arms 51 and 52 engage retainers 14' in the same manner as supports 12' in FIGS. 2–4. The arms 51 and 52 are pivotably secured to the rocket motor 10' by means of journal members 54 and 55 attached to the rocket motor. The arms 51 and 52 are pinned to a V-shaped member 57, having a member 58 thereon for receiving a thrust member 59. The thrust member 59 is secured to a thrust frame 61 which is secured to the aircraft. A pair of support brackets 64 and 65 are also secured to the thrust frame 61.

A bell crank 67 is pivotably supported on brackets 64 and 65 by means of a pin 68. One arm 70 of the bell crank has a pin 73 which engages the slot 74 in the rocket motor control shaft 72. A linear actuator 75 has a ring member 77 pivotably secured to a support 78 on the thrust frame 61. The operating arm 80 of the linear actuator 75 is pivotably attached to the arm 71 of the bell crank 67. A cross tie member 82 is secured to the thrust arms 51 and 52 and the V-shaped member 57. An elongated opening 83 is provided in the rocket motor shield 84 to permit movement of the rocket motor by the actuator 75. The actuator 75 is controlled in the manner as described below.

The operation of this apparatus is substantially the same as described above except that the rocket motor thrust is applied directly to the thrust frame 61 through arms 51 and 52, V-shaped member 57, member 58 and thrust member 59. The actuator 75 positions the rocket motor 10' without having to oppose any portion of the thrust of the rocket motor.

Figure 9:
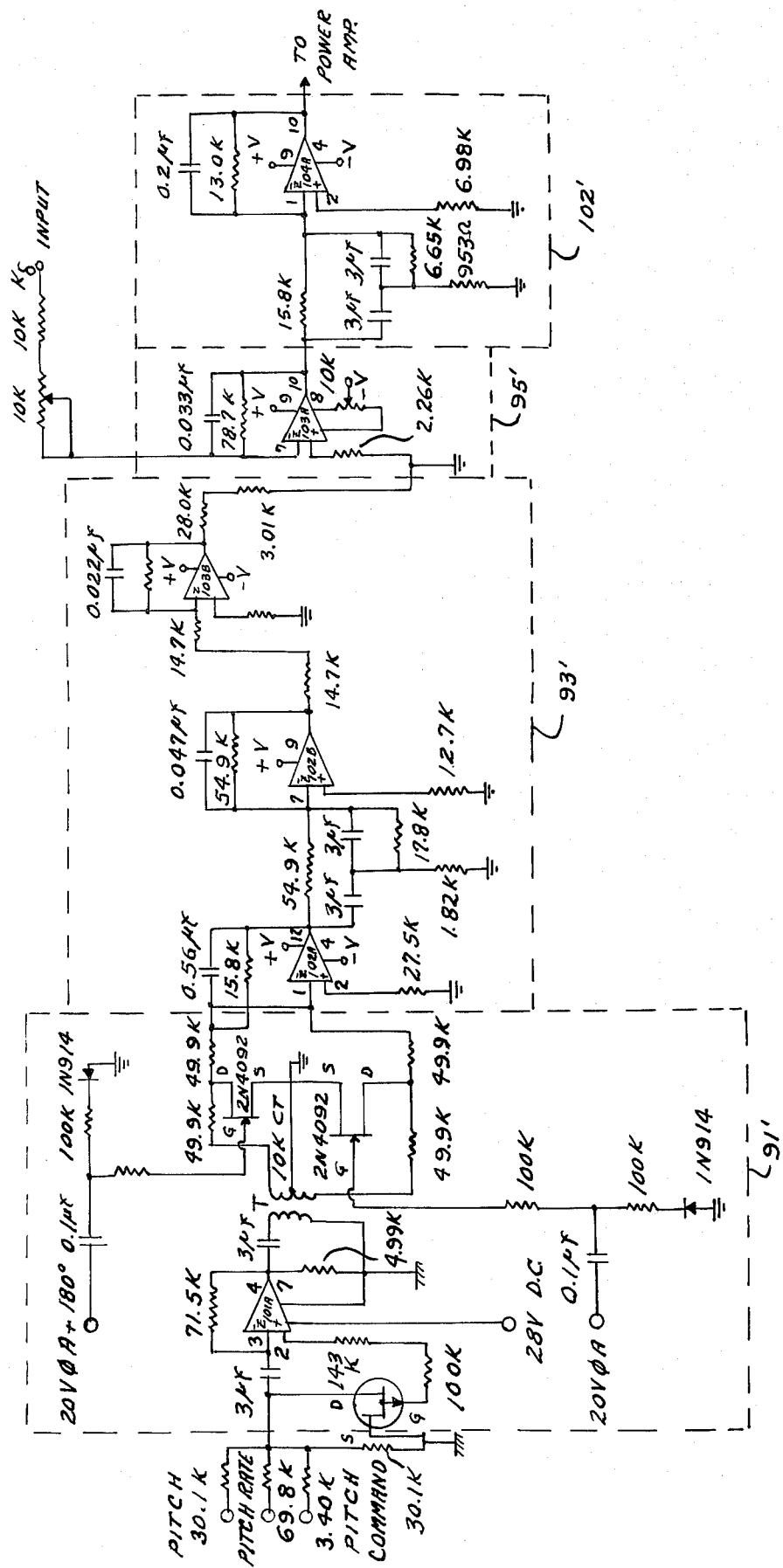
FIG. 9 is a circuit schematic of the aircraft pitch control system shown in block form in FIG. 8.

One prior art pitch attitude control circuit, which may be used to control the linear actuator 39, or linear actuator 75, is shown in FIG. 8. Use is made of pitch signals on the aircraft, which are used in normal flight, for controlling the pitch of the aircraft. A pitch signal $\theta$ from the vertical gyro, a pitch rate signal $\dot{\theta}$ from the pitch rate gyro and the aircraft pitch command $\theta_c$ are supplied to the summing amplifier and demodulation circuit 91, for which the schematic circuit of one prior art system which may be used is shown in block 91' in FIG. 9. The output of the circuit 91 is supplied to a filter circuit 93, for which the circuit schematic is shown in block 93' in FIG. 9. A linear actuator position signal from actuator position potentiometer 97 and actuator position gain circuit 99 are also supplied to the summing circuit 95. The output of the summing circuit 95 is supplied to a conventional power amplifier through a filter circuit 102, for which the circuit schematic is shown in block 102' in FIG. 9. The output of power amplifier 101 is supplied to the linear actuator designated 39'. This could be either actuator 39 in FIG. 3 of actuator 75 in FIG. 6. The linear actuator drives the thrust vector control mechanism shown in either FIGS. 2–4 or FIGS. 5–7 as well as the actuator position potentiometer 97. It is to be understood that a pitch control circuit, other than that shown, could be used or be adapted for use with the thrust vector control system of the invention.

While the rocket motor thrust vector control system of FIG. 2 and FIG. 5 are shown as mounted externally to the aircraft, the linear actuator 75' and bell crank linkage 67' could be located within the aircraft as shown in the apparatus of FIG. 10. Other elements of this apparatus, which are the same as those in FIG. 5, are given like reference numbers.

There is thus provided an apparatus to vary the rocket motor thrust vector in response to the aircraft pitch attitude control system wherein the thrust vector control system is not jettisoned with the rocket motor.

We claim:

1. In combination with a zero-length launch aircraft including a rocket motor; means for releasably supporting the rocket motor on said aircraft and means, connected between the rocket motor and the aircraft, for applying the thrust of the rocket motor to the aircraft; a rocket motor thrust vector pitch attitude control system, comprising: means, forming part of said supporting means for the rocket motor, for pivotably supporting the rocket motor, in pitch, on the aircraft; said means for applying the thrust of the rocket motor to the aircraft including a thrust frame secured to the aircraft; means, on said aircraft, for providing a pitch control signal; a linear actuator, responsive to said pitch control signal; means supported on said thrust frame and connected to said linear actuator for moving the rocket motor in pitch in response to movements of said linear actuator.

2. The device as recited in claim 1 wherein said means for releasably supporting the rocket motor on said aircraft includes a pair of elongated retainers positioned on opposite sides of the aircraft; a pair of support arms attached to said rocket motor and slidably engaging said retainers; said means for applying the thrust of the rocket motor to the aircraft including a thrust shaft on the forward end of said rocket motor and means, forming part of said means for moving the rocket motor in pitch, for applying the rocket thrust from said thrust shaft to said thrust frame.

3. In combination with a zero-length launch aircraft including a rocket motor; means for releasably supporting the rocket motor on said aircraft and means, connected between the rocket motor and the aircraft, for applying the thrust of the rocket motor to the aircraft; a rocket motor thrust vector pitch attitude control system, comprising: means, forming part of said support means for the rocket motor, for pivotably supporting the rocket motor, in pitch, on the aircraft; means, connected to said rocket motor and said aircraft, for adjusting the pitch angle of the rocket motor with respect to the longitudinal axis of the aircraft; said means, for adjusting the pitch angle of the rocket with respect to the longitudinal axis of the aircraft, including means, on said aircraft, for providing a pitch control signal; means responsive to said pitch control signal, for changing the pitch attitude of said rocket motor; said means, for changing the pitch attitude of the rocket motor, including thrust frame secured to the aircraft; a linear actuator, responsive to said pitch control signal; means supported on said thrust frame and connected to said linear actuator for moving the rocket motor in pitch in response to movements of said linear actuator; said means for releasably supporting the rocket motor on said aircraft including a pair of elongated retainers positioned on opposite sides of the aircraft; a pair of support arms pivotably secured to the rocket motor on a line through the center of gravity of the rocket motor slidably engaging said retainers; said support arms having portions extending forward of said rocket motor; means, attached to the forward extending portions of said support arms, forming part of said means for applying the thrust of the rocket motor to the aircraft; means, on said thrust frame engaging said means attached to the forward extending portion of said support arms, forming another part of said means for applying the thrust of the rocket motor to the aircraft.

4. The device as recited in claim 3 wherein said means for moving the rocket motor in pitch in response to movements of the linear actuator includes a control shaft connected to said rocket motor and a bell crank pivotably supported on said thrust frame and having one arm connected to said linear actuator and a second arm engaging said control shaft.

* * * * *